United States Patent [19]
Reinartz et al.

[11] 4,354,712
[45] Oct. 19, 1982

[54] DUAL-CIRCUIT PRESSURE CONTROL VALVE FOR HYDRAULIC BRAKE SYSTEMS

[75] Inventors: Hans-Dieter Reinartz, Frankfurt am Main; Bernd Schopper, Hattersheim; Peter Tandler, Falkenstein; Derek Lowe, Glashuetten, all of Fed. Rep. of Germany

[73] Assignee: ITT Industries, Inc., New York, N.Y.

[21] Appl. No.: 227,835

[22] Filed: Jan. 23, 1981

[30] Foreign Application Priority Data

Feb. 11, 1980 [DE] Fed. Rep. of Germany ....... 3004964
Aug. 14, 1980 [DE] Fed. Rep. of Germany ....... 3030783
Oct. 8, 1980 [DE] Fed. Rep. of Germany ....... 3038004

[51] Int. Cl.³ .............................................. B60T 8/26
[52] U.S. Cl. .................................. 303/6 C; 303/22 R
[58] Field of Search ............. 188/349; 303/6 C, 22 R, 303/24 C, 50

[56] References Cited

U.S. PATENT DOCUMENTS

| | | | |
|---|---|---|---|
| 4,053,185 | 10/1977 | Carre | 303/6 C |
| 4,203,627 | 5/1980 | Kono | 303/6 C |
| 4,274,681 | 1/1981 | Tsuda et al. | 303/6 C |

*Primary Examiner*—Duane A. Reger
*Attorney, Agent, or Firm*—John T. O'Halloran; Alfred C. Hill

[57] ABSTRACT

Dual-circuit pressure control valves are known in which the control pistons are acted upon by a common control force. A preload distributor constructed as beams of balance to compensate for differences in the control behavior of the two control valves due to manufacturing tolerances have not provided the desired compensation. Therefore, according to the present invention an improved compensation arrangement is provided in the form of a compensating piston which is subjected to the outlet pressures of the two brake circuits.

37 Claims, 6 Drawing Figures

DUAL-CIRCUIT PRESSURE CONTROL VALVE FOR HYDRAULIC BRAKE SYSTEMS

BACKGROUND OF THE INVENTION

The present invention relates to a dual-circuit pressure control valve for hydraulic brake systems having two control valves arranged in a housing in a parallel side by side relationship each assigned a different one of the two brake circuits, each of the two control valves having a separate control piston located between an associated inlet chamber and an associated outlet chamber, and the control pistons are subjected to a common control force acting on the pistons through the intermediary of a preload distributor.

In a known dual-circuit pressure control valve of the aforementioned type such as disclosed in German Pat. DE-OS No. 2,614,080, the two control pistons are arranged in a parallel side by side relationship. The preload distributor includes a semicircular disc made of elastic material which abuts with its entire circumferential surface on a supporting element with the same radius. The elastic disc has both end surfaces embraced by further wall components of the supporting element and which has a rigid beam at the diameter surface, against which beam the control pistons are adapted to bear. The supporting element is carried by a lever upon which a control force acts which is variable dependent upon the vehicle's axle load. With varying pressures prevailing at the outlet of the two pressure control valves, the system comprising the two control pistons and the distributor will be displaced in such a way that additional pressure fluid is fed to the brake circuit having the lower pressure until the balance in pressure is re-established. Thus, it is possible to compensate to a certain extent for discrepancies in tolerance occurring in the manufacture of the control valves. Moreover, if one brake circuit fails, the pressure in the still intact brake circuit is allowed to increase. It has to be taken into consideration, however, that the distributor is largely made of elastic material, in particular rubber, and is, therefore, subjected to substantial aging and wear phenomena. This is especially true due to the considerable fluctuations in temperature occurring in automotive vehicles, due to the ingress of dirt and the strong forces to be absorbed during each braking operation, which leads to a deformation or a grinding along the supporting surface. Besides, difficulties arise if the two control pistons do not act upon the distributor precisely symmetrically.

SUMMARY OF THE INVENTION

It is an object of the present invention to provide a dual-circuit pressure control valve of the type referred to hereinabove, in which all tolerances of the control valves are compensated for and in which the two outlet pressures of the pressure control valve are equal during the entire life span of the device.

A feature of the present invention is the provision of a dual-circuit pressure control valve for hydraulic brake systems comprising two control valves disposed in a housing in a parallel side by side relationship, each of the two control valves controlling a different one of two brake circuits, having a control piston disposed between an inlet chamber and an outlet chamber and subjected to a common control force acting on each of the control pistons through a preload distributor; and means disposed in the housing disposed between the outlet chamber of one of the two control valves and the outlet chamber of the other of the two control valves to provide a hydraulic balancing of the outlet pressure in each of the outlet chambers.

As a result of this measure, all manufacturing tolerances of the control valves and of the preload distributor are compensated for and the closure travel of the control valves is kept small.

In a suitable improvement upon the subject matter of the present invention, the means for the hydraulic balancing is a piston with end surfaces of equal size, which piston is acted upon by the pressures in the outlet chambers and on account of whose movement the valve of the one brake circuit is adapted to be controlled. It is attained by this arrangement that the piston has to move only in the area of the closure travel of the valve. To keep the loss in volume of the one brake circuit at a minimum possible rate in the event of failure of the other brake circuit and to ensure an increase of the change-over point in the event of a circuit failure independently of the piston's diameter, it is suggested that the piston be displaceable within limits. This may be accomplished in a particularly simple way by providing the piston with a radial extension which is located between a shoulder and a stop ring fastened in the housing. Advantageously, the radial extension is formed by a collar arranged at the end surface of the piston defining the outlet chamber.

To enable the piston to directly control the valve without insertion of transmitting members, the piston and the stepped piston are arranged in series on a common axis.

For increasing the change-over point of the intact brake circuit to the double pressure valve upon failure of the other brake circuit, the preload distributor is favorably guided in the direction of the axes of the stepped pistons. To vary the control force acting on the stepped pistons dependent upon the vehicle's axle load, it is advantageous that the preload distributor is a lever adapted to swivel around a transverse axis of the stepped pistons. Preferably, the stepped piston includes a clearance relative to the preload distributor. It is thereby obtained that a valve closes to begin with and that a further pressure increase in this circuit is effected by controlling the valve through the piston. To be able to determine the clearance exactly, it is suitable to provide a means for adjustment of the clearance. A spring may be arranged between the stepped piston and the preload distributor which will load the stepped piston when depressurized back to its end position close to the outlet chamber. The same effect as that of the clearance between stepped piston and preload distributor may be achieved by providing the control valves with different closure travels.

A dual-circuit pressure control valve, in which the control pistons are of smaller diameter, is advantageously constructed in such a manner that the control valves each include one slidable sleeve being sealed at its outer periphery and forming a valve seat at the one end surface, that the shanks of the control pistons penetrate each of the sleeves with clearance and have a valve plate at its end portion, that the one sleeve is synchronized with the compensating piston and that a stop is provided for fixing the rest position of the other sleeve.

The control piston has a comparatively small diameter in this construction, since it does not have to incorporate any valve components in its inside. Due to the smaller cross section, it is possible to operate the device with a lower amount of control force than heretofore. Therefore, a less powerful and-with regard to the manufacturing tolerances-less exact spring may be employed, or a smaller lever transmission is sufficient. Both solutions result in a reduced space requirement. The diameter to be sealed is comparatively small, the friction forces which have to be overcome upon a displacement are correspondingly insignificant. Thereby a very precise operation of the control piston is achieved. The sleeve bearing the valve seat is freely accessible at its periphery. It is, therefore, not difficult to couple the one sleeve with the compensating piston. Valve closure springs are not required. This avoids in addition the occurrence of the reactive effect of such a spring on the compensating piston.

Advantageously, the compensating piston is of a larger outside diameter than the sleeve. It is thereby accomplished that even slightest differences in the outlet pressure cause a sufficiently great force to displace the associated sleeve.

Favorably, the compensating piston and the associated sleeve are coaxially arranged in tandem and are rigidly connected to each other by means of a bridge extending over the valve plate cooperating therewith. With the aid of the bridge, the sleeve may be loaded axially from the compensating piston despite the existence of the valve plate.

For the resetting of the sleeve, the control piston advantageously includes a shoulder which is able to act upon an end surface of the sleeve remote from the valve seat. Since the control pistons are reset by the control force and entrain the sleeve, no separate return spring is required for the sleeve. The advantage is that the compensating piston is able to displace the sleeve without having to overcome a spring force, thereby rendering possible a still more precise pressure balance.

For fixing the rest position of the other sleeve, a stop formed in the housing may cooperate with a step at the outer periphery of the sleeve. This results in a particularly simple construction.

In a dual-circuit pressure control valve with unsymmetrical construction, slight differences in the control behavior of the valves cannot be avoided completely, and, moreover, the control valve assigned to the compensating piston has to close first. It is, therefore, particularly expedient to have the compensating piston act on a distribution device which will influence both control valves at the same time, but in an opposite sense in the event of an actuation.

This distribution device results in both control pistons and both control valves operating completely equally in status. There is no need for a lost motion for the one control piston. If the control valves include locking springs, the effect of these springs will be equalized by each other. The desired like pressure in both outlet chambers is achieved quickly in each case by the opposing influence on the two control valves. In addition to this, the components are accommodated symmetrically in the housing so that a simpler and more compact construction is achieved.

According to a preferred embodiment, the distribution device comprises a distribution element which is slidably arranged transversely to the axes of the two control pistons and each includes an inclined surface to additionally govern a control valve with the inclined surfaces being oppositely sloped relative to each other.

This leads to a very simple construction of the distribution element and permits a space-saving construction in comparison with tiltable distribution elements or the like.

In particular, the compensating piston and the distribution element may be integrally formed. This combination saves component parts. Since the compensating piston is situated transversely to the control pistons, a housing is obtained which has a short length in direction of the control pistons' axes.

When using a cylindrical compensating piston, the compensation piston is provided with conical inclined surfaces close to its end portions.

It is, moreover, favorable to have a transmission piston seated on the inclined surface, which transmission piston is guided on the same axis with the associated control piston in the housing and acts on the control valve. This transmission piston ensures that the valve closure member is not loaded in the transverse direction on account of friction between the inclined surface and a valve tappet.

In another development of the present structure, an auxiliary inclined surface being oppositely sloped can join the outer ends of each inclined surface. In particular, the inclined surface and the auxiliary inclined surface can form a double cone. The auxiliary inclined surface enables, upon failure of the one circuit, the control valve of the other circuit to be urged compulsorily to the open position so that in this circuit the outlet pressure follows the inlet pressure even in the case of higher values. In this arrangement, the remaining stroke of the stepped piston is desired to be only somewhat greater than the closure travel of the valve.

Besides, a differential pressure indicating device can be provided, whose actuating element engages in a groove in the piston portion between the inclined surfaces. The groove requires including the seals on both sides of a specific axial length of the compensating piston. Since the compensating piston is no longer permitted to be arranged in axial prolongation of the one control piston but transversely thereto, it is not difficult to construct the compensating piston with this specific length.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
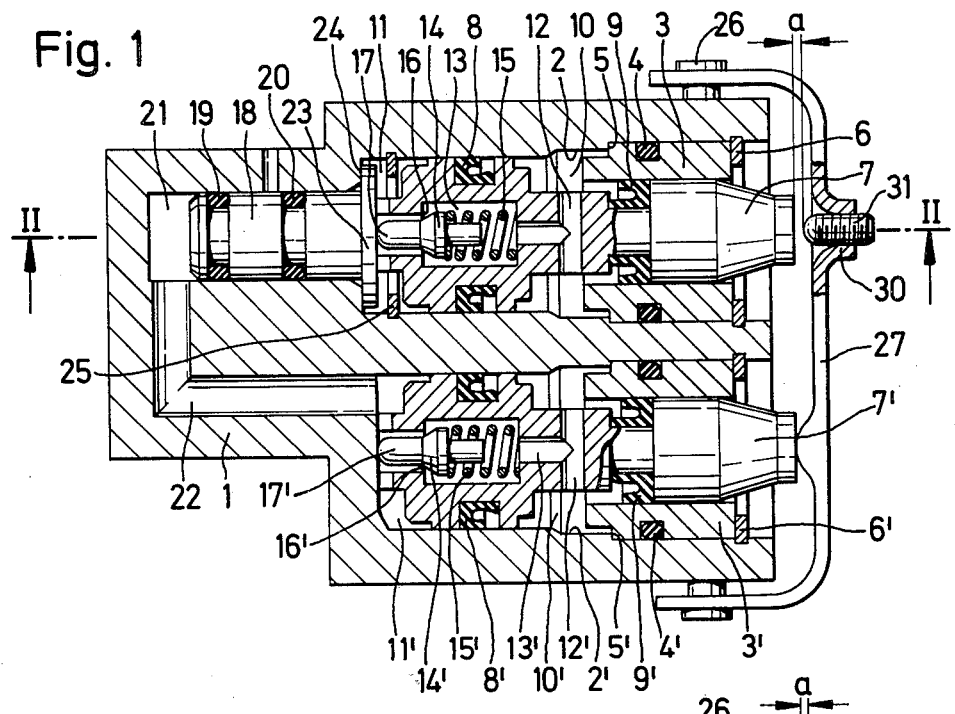
FIG. 1 is a longitudinal cross-sectional view of a first embodiment of a dual-circuit pressure control valve in accordance with the principles of the present invention.

In FIG. 1, a housing 1 accommodates two parallel, stepped bores 2 and 2' in which the control valves are disposed. Since the two control valves are substantially alike, the valves will not be described separately in the following; however, the valve components will be assigned the reference numerals of both devices. Slight differences will be pointed at where need be.

A sleeve 3,3' is arranged in the enlarged bore portion of bore 2,2' and sealed relative to housing 1 by means of a sealing ring 4,4'. Sleeve 3,3' abuts a first shoulder 5,5' of housing 1 and is secured against axial displacement by means of a ring 6,6' fastened in the housing 1. Located in each bore 2,2' is a stepped piston 7,7' which is guided by its larger diameter portion in bore 2,2' and with its smaller diameter portion in sleeve 3,3' and which is sealed by seals 8,8' and 9,9'.

An inlet chamber 10,10' is bounded by an annular surface between the steps of stepped piston 7,7' and an outlet chamber 11,11' by the end surface of the larger diameter portion of stepped piston 7,7'. A radial bore 12,12' and a coaxial fluid passageway 13,13' in the inside of stepped piston 7,7' connects inlet chamber 10,10' to outlet chamber 11,11'. Disposed in fluid passageway 13,13' is a valve closure member 14,14' being loaded against a valve seat 16,16' by a spring 15,15'. Valve closure member 14,14' accommodates a tappet 17,17' projecting from stepped piston 7,7'.

Arranged in an extension of bore 2 tapered in its diameter is a piston 18 which is sealed relative to housing 1 by means of two seals 19 and 20. Piston 18 defines with its end surfaces, being of equal size, outlet chamber 11, on the one hand, and a pressure chamber 21, on the other hand. Pressure chamber 21 communicates with outlet chamber 11' via a pressure fluid channel 22. The end portion of piston 18 close to outlet chamber 11 is radially enlarged in the form of a collar 23, with collar 23 being disposed between a second shoulder 24 of housing 1 and a stop ring 25 fastened in housing 1. Piston 18 is displaceable within limits, with its respective end position being defined by shoulder 24 and stop ring 25.

Tappet 17 of valve closure member 14 projecting from stepped piston 7 bears against collar 23, and tappet 17' of valve closure member 14' projecting from stepped piston 7' bears against the bottom of bore 2'. Because of this, both control valves are opened in the inactivated position of the device.

Secured to housing 1 by means of a pivot 26 is a lever 27 which is adapted to swivel around the longitudinal axis of pivot 26. Lever 27 bears against one end of one of stepped pistons 7,7' in the inactivated position of the device. At its point lying opposite the end of piston 7, lever 27 includes a threaded portion 30 in which an adjusting screw 31 is accommodated. In the embodiment shown, the piston end of stepped piston 7 has a clearance relative to adjusting screw 31, which is smaller than the valve closure travel and whose significance will be described below when the operation of the device is described.

Figure 2:
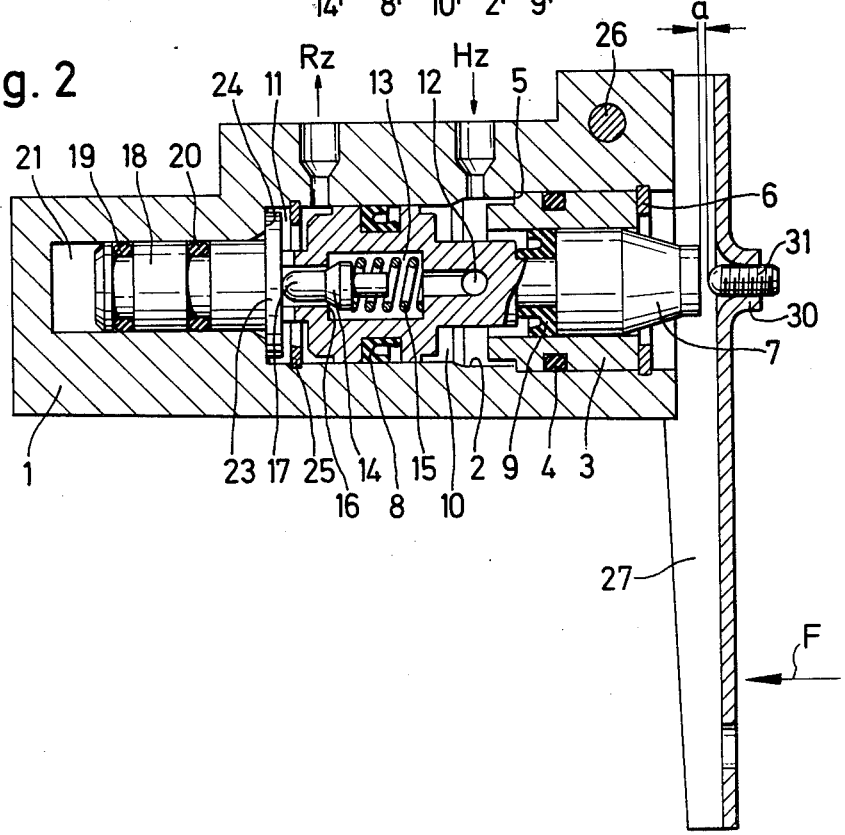
FIG. 2 is a longitudinal cross-sectional view taken along the line II—II of FIG. 1.

A longitudinal cross section taken along the line II—II in FIG. 1 is shown in FIG. 2. The reference numerals of the individual elements correspond to those in FIG. 1. From FIG. 2, the moving ability of lever 27 can be clearly seen, and that a force designated F acts on lever 27. Force F is variable and serves as a control force of valve pistons 7,7'. In addition, FIG. 2 shows the pressure fluid ports leading to the master cylinder Hz and the wheel cylinder Rz.

The mode of operation of the braking pressure control unit illustrated in FIGS. 1 and 2 will be first described assuming that both brake circuits are operable. In the inactivated position of the device, the movable parts will be positioned as illustrated with the exception that stepped piston 7 abuts adjusting screw 31 and clearance a is situated between collar 23 and housing shoulder 24. Closure members 14,14' of the control valves are opened in this position.

When the brake is actuated, the pressure fluid in both brake circuits will first of all be allowed to flow unhindered from the master cylinder Hz to the wheel cylinders Rz. Acting in each case on the stepped pistons 7,7', due to different sized pressurized surfaces, is a differential of force which causes a movement of stepped pistons 7,7' in opposition to lever 27 and control force F acting thereupon.

Since the closure travel of the valve 14,16 is reduced by the amount of the clearance a, it will be valve closure member 14 that closes fluid passageway 13 first by abutting the valve seat 16 after the remaining closure travel has been overcome. The other valve 14',16', the closure travel of which is not reduced by the amount of the clearance a, will be still open in the event of the same displacement travel of both stepped pistons 7,7', and the pressure build-up will thus be continued undiminished in the associated brake circuit. Due to the slight difference in pressure occurring in outlet chambers 11 and 11', a resultant force will act on piston 18 and displace piston 18 in the direction of stepped piston 7. Thereby, collar 23 acts upon tappet 17 and lifts valve closure member 14 from its valve seat 16. As a result, additional pressure fluid is supplied to outlet chamber 11 until the same pressure prevails there as in outlet chamber 11'. This compensation procedure will be repeated, if necessary, until stepped piston 7', too, has overcome the closure travel of valve 14',16'.

A further pressure increase on the inlet side results in a reduced pressure increase on the outlet side, with the pressures in the outlet chambers 11,11' being always of equal amount due to the compensating effect of piston 18. The pressure level, at which the reducing effect of the control valves occurs, is dependent on the magnitude of control force F which may be fixedly set or may be variable.

When the pressure is decreased on the inlet side, valve closure members 14,14' will be lifted from valve seats 16,16' on account of the pressure still prevailing on the outlet side causing the pressure being decreased there, too. Control force F causes stepped pistons 7 and 7' to move back to their inactive positions, with stepped piston 7' moving in abutment with the end surface of housing 1 and the clearance a being maintained between the housing shoulder 24 and collar 23.

If one of the brake circuits fails due to a defect, stepped piston 7,7' of the still intact brake circuit will have to overcome the entire control force F prior to the reducing effect of the valve taking place. The change-over pressure of the valve will be increased to double the value. For providing the volume input of the still intact brake circuit to be increased only slightly upon failure of a circuit, the displacement travel of piston 18 is bounded by shoulder 24 of housing 1 and stop ring 25.

Figure 3:
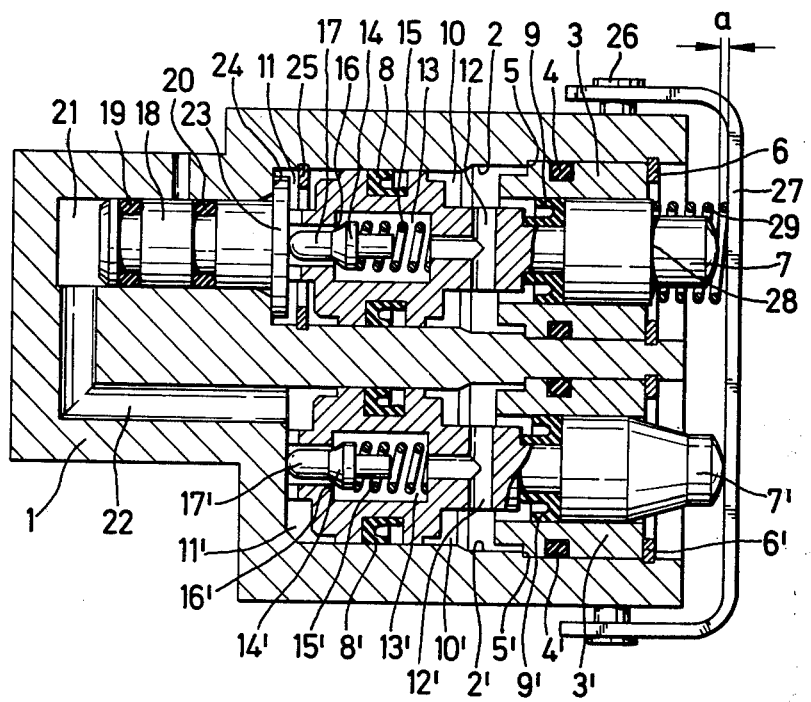
FIG. 3 is a longitudinal cross-sectional view of a second embodiment of a dual-circuit pressure control valve in accordance with the principles of the present invention.

The embodiment shown in FIG. 3 distinguishes from the embodiment of FIG. 1 merely in that piston 7 includes a step 28 close to its end portion projecting from housing 1 and a spring 29 having one end bearing against step 28 and its other end acting on lever 27. An adjusting screw, as is illustrated in FIGS. 1 and 2, can also be included in this arrangement. In principle, spring 29 could be inserted in a different place. However, in the illustrated device it affords the advantage of having no detrimental effects (for example, in the form of a pressure difference in the outlet chambers 11 and 11′).

The braking pressure control unit in accordance with FIG. 3 corresponds in its mode of operation with the preceding description referring to FIGS. 1 and 2. However, when the device is depressurized, spring 29 always causes stepped piston 7 to move to its end position closed to outlet chamber 11.

Figure 4:
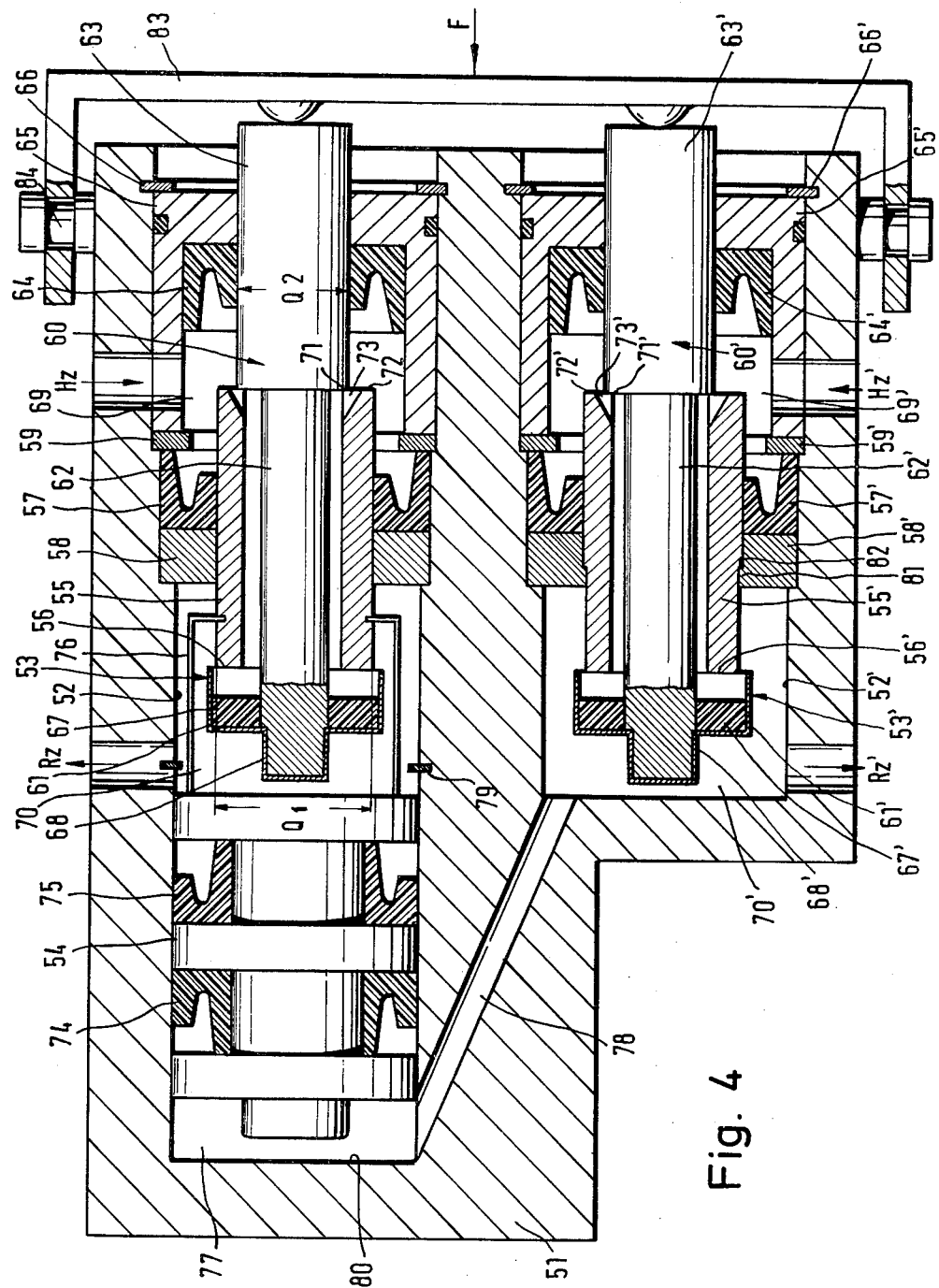
FIG. 4 is a longitudinal cross-sectional view of a third embodiment of a dual-circuit pressure control valve in accordance with the principles of the present invention.

In the embodiment of FIG. 4, two parallel stepped bores 52 and 52′ are provided in a housing 51. Located in bore 52 is a control valve 53 and a compensating piston 54 and located in bore 52′ is a control valve 53′.

Control valve 53 includes a sleeve 55 forming a valve seat 56 at one end surface thereof. Sleeve 55 is sealed at its outside by means of a seal 57 which is held between a guide ring 58 and a prop ring 59. A control piston 60 includes a valve plate 61, a shank portion 62 of smaller diameter penetrating sleeve 55 and a shaft portion 63 of greater diameter leading outwardly and surrounded by a seal 64. Seal 64 is arranged in an inset 65 which is held between prop ring 59 and a circlip 66. Valve plate 61 includes an elastic closure element 67 which is held by a sheet metal top 68 forming a guide flange at the same time. Control valve 53 separates an inlet chamber 69 communicating with a port Hz of a tandem master cylinder from an outlet chamber 70 connected to at least one wheel cylinder Rz. A step 71 between shank portions 62 and 63 cooperates with the end surface 72 of sleeve 55 in order to entrain sleeve 55 to the left-hand position. Notches 73 permit fluid flow in this position.

The compensating piston 54 is provided with two seals 74 and 75. A bridge 76 connects compensating piston 54 to sleeve 55. Bridge 76 is permeable to liquid. For example, bridge 76 may be welded annularly with the end surface of compensating piston 54 and may engage with resilient ribs in an annular groove of sleeve 55. Compensating piston 54 is located between outlet chamber 70 and a pressure chamber 77, the latter being connected via a bore 78 with outlet chamber 70′ of control valve 53′. The movement of the compensating piston is limited to the right by a circlip 79 and to the left by an end surface 80 of housing 51.

Control valve 53′ is of the same construction as control valve 53. Therefore, like parts are assigned like reference numerals, however, marked with an apostrophe. In this arrangement, the inlet chamber 69′ is connected with a second port Hz′ of a tandem master cylinder. The outlet chamber 70′ leads to at least one other wheel cylinder Rz′. In addition, provided in the guide ring 58′ is a stop 81 which cooperates with a step 82 at sleeve 55′. Acting on the end surfaces of both control pistons 60 and 60′ leading out of housing 51 is a lever 83 which is adapted to swivel around pivots 84 and, located outside the drawing plane, to be loaded by a control force F. Force F may be constant or responsive to the vehicle load.

In normal operation, the arrangement illustrated in FIG. 4 operates as follows:

With pressure fluid subjected to increasing pressure being fed to the two inlet chambers 69,69′, the pressure in the outlet chambers 70,70′ rises in the same manner. When the inlet pressure in each brake circuit multiplied by the surface Q2 exceeds half the control force F, both control valves 53,53′ will close. Thereupon, a rise of the outlet pressure will occur, said rise being reduced with reference to the rise of the inlet pressure according to the relation $$\frac{\text{inlet pressure}}{\text{outlet pressure}} = \frac{Q1}{Q1 - Q2}.$$

In the event of control valve 53 closing prior to control valve 53′, a higher pressure will develop in outlet chamber 70′ and thus in pressure chamber 77 causing compensating piston 54 with sleeve 55 to be displaced to the right in the drawing so that control valve 53 opens anew until a pressure balance prevails in both outlet chambers 70,70′. In the event of control valve 53′ closing first, compensating piston 54 and sleeve 55 will be moved to the left in the drawing so that control valve 53 closes as well. If the inlet pressure is decreased, control pistons 60,60′ will return to the drawn initial position under the influence of the control force F. In doing so, pistons 60,60′ entrain sleeves 55,55′ via the step 71,71′. The backstroke is terminated when step 82 of sleeve 55′ abuts stop 81. The inactivated position of the system is defined this way.

When one brake circuit fails, the associated control piston remains in its rest position. The other control piston will then be loaded with the full control force F resulting in the change-over pressure of the valve being increased to double the value, which is desired in such cases.

Figure 5:
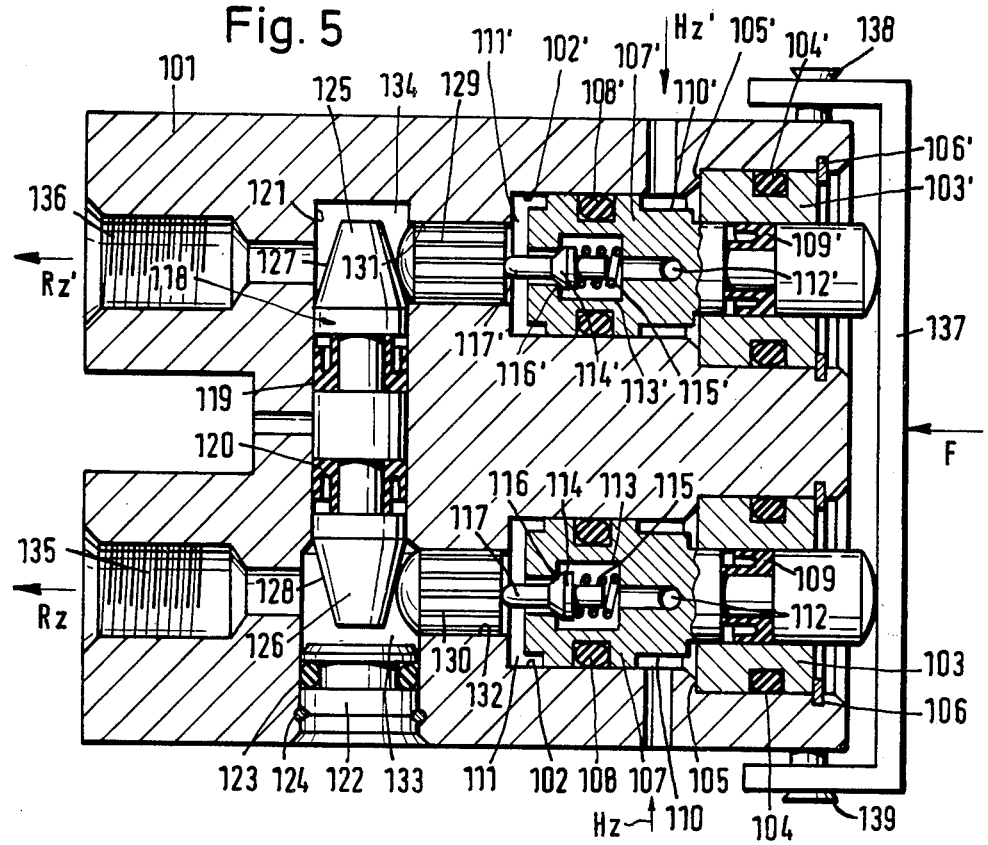
FIG. 5 is a longitudinal cross-sectional view of a fourth embodiment of a dual-circuit pressure control valve in accordance with the principles of the present invention.

In FIG. 5, two like control valves are accommodated in a housing 101, one of which will be described. The other control valve is assigned like reference numerals, however, marked with an apostrophe.

A stepped bore 102 is provided in its enlarged bore portion with a sleeve 103 which is sealed relative to housing 101 by means of a sealing ring 104. Sleeve 103 bears against a first shoulder 105 of housing 101 and is located against axial displacement by means of a ring 106 which is fastened in housing 101. A stepped piston 107 is guided with its larger diameter portion in bore 102 and with its smaller diameter portion in sleeve 103 and sealed by means of seals 108 and 109.

An inlet chamber 110 is defined by an annular surface between the larger and the smaller diameter portions of stepped piston 107 and an outlet chamber 111 is defined by the end surface of the larger diameter portion of stepped piston 107. Inlet chamber 110 and outlet chamber 111 communicate with each other via a radial bore 112 and a coaxial pressure fluid passageway 113 on the inside of stepped piston 107. Situated in pressure fluid passageway 113 is a valve closure member 114, which is loaded by a spring 115 against a valve seat 116. Valve closure member 114 includes a tappet 117 extending from stepped piston 107.

A compensating piston 118 which is sealed relative to housing 101 by means of two seals 119 and 120 is arranged in a transverse bore 121, bore 121 being closed by a plug 122 which is sealed relative to housing 101 by means of a seal 123 and which is fastened by means of a circlip 124. Compensating piston 118 is integrally formed with a distribution element which includes in this case two cones 125 and 126 whose inclined surfaces 127 and 128 are oppositely sloped with respect to each other. Seated on cones 125 and 126 are transmission pistons 129 and 130 which are guided in bores 131 and 132 by means of ribs. Via the channels remaining between the ribs, outlet chamber 111 is connected to the pressure chamber 133 on the one side of compensating piston 118, and outlet chamber 111' is connected to the pressure chamber 134 on the other side of compensating piston 118. Pressure chambers 133 and 134, on their part, communicate with ports 135 and 136, to which ports lines leading to wheel cylinders Rz and Rz' are connectible. The inlet chambers 110,110' are connected with two outlets Hz and HZ' of a tandem master cylinder.

A preloading force F acts on a lever 137 which is pivotable around two pivots 138 and 139 which are displaced from the drawing plane. Force F can be constant or vary load-responsively.

The mode of operation of the dual-circuit pressure control valve illustrated in FIG. 5 will first be described assuming that both brake circuits are operable. The two stepped pistons 107,107' bear with their end surface against the left-hand step of bores 102,102' in the rest position such that valves 114, 116 and 114', 116' are open. When the pressure increases at the inlet Hz,Hz', the pressure at the outlet Rz,Rz' will follow in the same way, since the two control valves 114,116 and 114',116' are open. With increasing pressure, the stepped pistons 107,107' will move to the right in the drawing, until the aforementioned valves finally close. In case one control valve 114,116 closes earlier than the other control valve 114',116', the pressure in the pressure chamber 134 will rise higher than the one in the pressure chamber 133, and the compensating piston 118 moves downwards. As a result, transmission piston 130 and, thus, tappet 117 will be shifted to the right in the drawing by means of inclined surface 128 so that control valve 114,116 opens again. At the same time, valve closure member 114' and transmission piston 131 will be displaced to the left in the drawing by locking spring 115' because inclined surface 127 offers the respective space therefor. Control valve 114',116' will be, therefore, moved in the closing direction. Due to this oppositely directed movement, both control valves will be closed approximately simultaneously and, for this reason, at the same pressure. With the inlet pressure continuing to rise, the outlet pressure follows along a characteristic curve with a reduced slope. If the control valve 114',116' had closed first, compensating piston 118 would have been moved upwards so that control valve 114',116' would have opened again and the other control valve 114,116 would have been moved in the closing direction.

When one brake circuit fails, compensating piston 118 will move to the stop provided by plug 122 or the stop provided by the oppositely disposed end surface of transverse bore 121, and the control valve of the operable brake circuit will function as usual. The valve will, however, close after a shorter travel of piston 107,107' and against an increased force because the preloading force F is no longer distributed onto the two pistons. In total, the changeover pressure of the intact valve will, therefore, be increased when a circuit fails.

It is, however, frequently desired in the event of failure of the one brake circuit to keep the outlet pressure of the other brake circuit always at the same level as the inlet pressure. This may be achieved by the embodiment according to FIG. 6.

Figure 6:
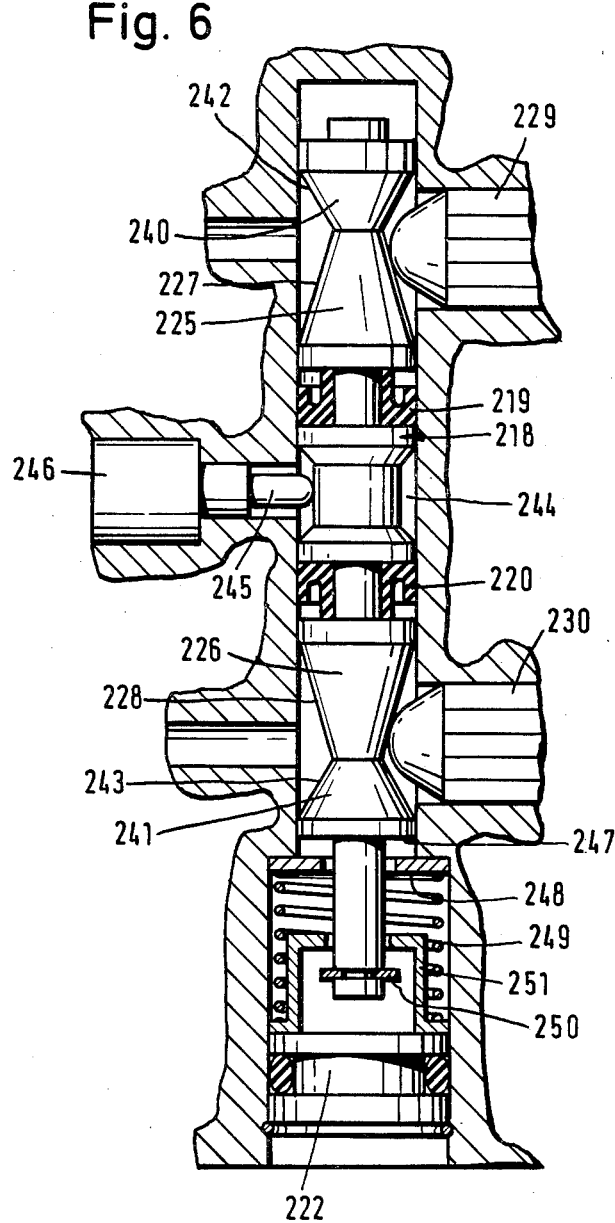
FIG. 6 illustrates a variant of the embodiment of FIG. 5.

In FIG. 6, like parts are assigned like reference numerals as in FIG. 5, increased by 100. In this structure, adjoining the two cones 225,226 with their inclined surfaces 227,228 are auxiliary cones 240,241 with oppositely sloped inclined surfaces 242,243, respectively. When the compensating piston 218 is urged into the one end position upon failure of the one brake circuit, these inclined surfaces cause the transmission piston 230,231 to be pressed completely to the right in the drawing of FIG. 5, and, by this means, to constantly keep open the pertinent control valve 114,116 or 114',116'. To the end that this is accomplished for sure, the maximum displacement travel of piston 107—as shown in FIG. 5—which always has to be greater than the closure travel of the valve 114,116, is smaller than the sum of the displacement travel of the transmission piston 130 (in the case of piston 107', transmission piston 129 is meant) upon failure of a brake circuit plus the valve closure travel. Therefore, the wheel cylinders of the brake circuit in operation are supplied with the full inlet pressure over the entire range of pressure.

In addition, compensating piston 218 has a groove 244 between inclined surfaces 227 and 228, in which a tripping pin 245 of a differential pressure indicating device 246 engages. This groove 244 is of such an axial length that the compensating function of compensating piston 218 is possible in the range of the usual pressure differentials of the inlet pressures without actuating the differential pressure indicating device 246. After a predetermined travel, compensating piston 218 with its end surface 247 will be in operative connection via a spring plate 248 with a spring 249, or with a circlip 250 via a spring plate 251 with spring 249. As soon as the differential of pressure between the two brake systems acting on compensating piston 218 exceeds the preload of spring 249, tripping pin 245 is moved by groove 244 outwardly so that a switching operation occurs which provides an indication.

The compensating piston is likewise able to act on a distribution device separated therefrom. The distribution device may, for instance, be composed of a lever which is tiltable around a point of rotation arranged between the two stepped pistons' axes. The inventive principle can be used in connection with control valves of different design as well.

While we have described above the principles of our invention in connection with specific apparatus, it is to be clearly understood that this description is made only by way of example and not as a limitation to the scope of our invention as set forth in the objects thereof and in the accompanying claims.

We claim:

1. A dual-circuit pressure control valve for hydraulic brake systems comprising:

two control valves disposed in a housing in a parallel side by side relationship, each of said two control valves controlling a different one of two brake circuits, having a control piston disposed between an inlet chamber and an outlet chamber and subjected to a common control force acting on each of said control pistons through a preload distributor; and means disposed in said housing disposed between said outlet chamber of one of said two control valves and said outlet chamber of the other of said two control valves to provide a hydraulic balancing of the outlet pressure in each of said outlet chambers.

2. A pressure control valve according to claim 1, wherein said means includes a compensating piston having end surfaces of equal size each acted upon by pressure in an associated one of said outlet chambers, movement of said compensating piston controlling a valve associated with each of said control pistons.

3. A pressure control valve according to claim 2, wherein
said compensating piston is displaceable between spaced stops.

4. A pressure control valve according to claim 3, wherein
said compensating piston includes a radial extension disposed between a shoulder formed in said housing and a stop ring fastened in said housing spaced from said shoulder.

5. A pressure control valve according to claim 4, wherein
said radial extension is a collar on the end surface of said compensating piston which defines said outlet chamber of one of said two control valves.

6. A pressure control valve according to claims 2, 3, 4 or 5, wherein
said compensating piston and one of said control pistons are disposed in tandem on a common axis.

7. A pressure control valve according to claims 1, 2, 3, 4 or 5, wherein
said preload distributor is guided in the direction of the axis of said two control pistons.

8. A pressure control valve according to claim 7, wherein
at least one of said control pistons has a predetermined clearance relative to said preload distributor.

9. A pressure control valve according to claim 8, wherein
said predetermined clearance is adjustable.

10. A pressure control valve according to claim 8, wherein
a spring is disposed between said one of said control pistons and said preload distributor.

11. A pressure control valve according to claim 7, wherein
said preload distributor is a lever capable of swivelling around an axis in transverse relationship to said control pistons.

12. A pressure control valve according to claim 11, wherein
at least one of said control pistons has a predetermined clearance relative to said lever.

13. A pressure control valve according to claim 12, wherein
said predetermined clearance is adjustable.

14. A pressure control valve according to claim 12, wherein
a spring is disposed between said one of said control piston and said lever.

15. A pressure control valve according to claim 7, wherein
each of said two control valves have a different closure travel.

16. A pressure control valve according to claim 3, wherein
each of said two control valves include a slidable sleeve having its outer periphery sealed to said housing and one end thereof providing a valve seat, and
each of said control pistons includes a shank portion extending through an associated one of said sleeves with clearance between the inner surface of said associated one of said sleeves and the outer surface of said shank portion, said shank portion carrying a valve plate on the end thereof adjacent said valve seat,
one of said sleeves being connected to move with said compensating piston, and
a stop fastened to said housing for the other of said sleeves to establish a rest position for said other of said sleeves.

17. A pressure control valve according to claim 16, wherein
said compensating piston has a larger outer diameter than said one of said sleeves.

18. A pressure control valve according to claims 16 or 17, wherein
said compensating piston and said one of said sleeves are disposed in tandem coaxial of a common axis and rigidly connected with each other by a bridge extending over an associated one of said valve plates.

19. A pressure control valve according to claim 18, wherein
each of said control pistons includes a step engaging the other end surface of an associated one of said sleeves remote from said valve seat.

20. A pressure control valve according to claim 19, wherein
said stop cooperates with a step in the outer periphery of said other of said sleeves to establish said rest position thereof.

21. A pressure control valve according to claim 18, wherein
said stop cooperates with a step in the outer periphery of said other of said sleeves to establish said rest position thereof.

22. A pressure control valve according to claims 16 or 17, wherein
each of said control pistons includes a step engaging the other end surface of an associated one of said sleeves remote from said valve seat.

23. A pressure control valve according to claims 16 or 17, wherein
said stop cooperates with a step in the outer periphery of said other of said sleeves to establish said rest position thereof.

24. A pressure control valve according to claim 3, wherein
said compensating piston acts on a distribution device for each of said control valves which when actuated will influence each of said two control valves at the same time, but in an opposite sense.

25. A pressure control valve according to claim 24, wherein
said distribution device includes two distribution elements disposed to slide in a transverse relationship to the axes of said control pistons, each of said two distribution elements having an inclined surface to control a different one of said two control valves, said inclined surface of one of said two distribution elements being sloped in an opposite direction relative to said inclined surface of the other of said two distribution elements.

26. A pressure control valve according to claim 25, wherein
said compensating piston and said two distribution elements are integrally formed.

27. A pressure control valve according to claim 26, wherein said compensating piston is cylindrical and having on opposite ends thereof conical inclined surfaces to provide said two distribution elements.

28. A pressure control valve according to claims 25, 26 or 27, further including
a pair of transmission pistons each having one end thereof abutting a different one of said inclined surfaces and guided in said housing along the same axis as an associated one of said control pistons, the other end of each of said pair of transmission pistons acting on an associated one of said two control valves.

29. A pressure control valve according to claim 28, further including
a pair of auxiliary inclined surfaces each joined with the outer end of a different one of said inclined surfaces and having a slope opposite to the slope of the associated one of said inclined surfaces.

30. A pressure control valve according to claim 29, wherein
each of said inclined surfaces and said auxiliary inclined surfaces form a double cone.

31. A pressure control valve according to claim 30, further including
a differential pressure indicating device having an actuating element engaged in a groove intermediate said inclined surfaces.

32. A pressure control valve according to claim 29, further including
a differential pressure indicating device having an actuating element engaged in a groove intermediate said inclined surfaces.

33. A pressure control valve according to claim 28, further including
a differential pressure indicating device having an actuating element engaged in a groove intermediate said inclined surfaces.

34. A pressure control valve according to claims 25, 26 or 27, further including
a pair of auxiliary inclined surfaces each joined with the outer end of a different one of said inclined surfaces and having a slope opposite to the slope of the associated one of said inclined surfaces.

35. A pressure control valve according to claim 34, wherein
each of said inclined surfaces and said auxiliary inclined surfaces form a double cone.

36. A pressure control valve according to claim 35, further including
a differential pressure indicating device having an actuating element engaged in a groove intermediate said inclined surfaces.

37. A pressure control valve according to claims 25, 26 or 27, further including
a differential pressure indicating device having an actuating element engaged in a groove intermediate said inclined surfaces.